United States Patent
Shin et al.

(10) Patent No.: US 11,613,082 B2
(45) Date of Patent: Mar. 28, 2023

(54) METHOD FOR PRODUCING 3D MESH SURFACE CHARACTERISTIC-BASED SUPPORT FOR LAMINATE MANUFACTURING

(71) Applicant: Korea Electronics Technology Institute, Seongnam-si (KR)

(72) Inventors: Hwa Seon Shin, Yongin-si (KR); Hye In Lee, Anyang-si (KR); Sung Hwan Chun, Seoul (KR); Ji Min Jang, Seoul (KR); Sung Hun Park, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 17/256,849

(22) PCT Filed: Feb. 20, 2020

(86) PCT No.: PCT/KR2020/002461
§ 371 (c)(1),
(2) Date: Dec. 29, 2020

(87) PCT Pub. No.: WO2020/204353
PCT Pub. Date: Oct. 8, 2020

(65) Prior Publication Data
US 2021/0252787 A1    Aug. 19, 2021

(30) Foreign Application Priority Data
Mar. 29, 2019 (KR) .......................... 10-2019-0037122

(51) Int. Cl.
*B29C 64/386* (2017.01)
*B29C 64/40* (2017.01)
(Continued)

(52) U.S. Cl.
CPC ............ *B29C 64/386* (2017.08); *B29C 64/40* (2017.08); *B33Y 50/02* (2014.12); *G06T 17/20* (2013.01)

(58) Field of Classification Search
CPC ....... B29C 64/386; B29C 64/40; B33Y 50/02; B33Y 50/00; G06T 17/20;
(Continued)

(56) References Cited

U.S. PATENT DOCUMENTS

2004/0183796 A1* 9/2004 Velde ..................... B33Y 50/00
                                                     345/419
2014/0300017 A1   10/2014 Wighton et al.
(Continued)

FOREIGN PATENT DOCUMENTS

JP       2017-502411 A    1/2017
JP       6236112 B2      11/2017
(Continued)

OTHER PUBLICATIONS

Korean Office Action dated Mar. 30, 2021, in corresponding Korean Patent Application No. 10-2019-0037122 (3 pages in English and 5 pages in Korean).

*Primary Examiner* — Thomas C Lee
*Assistant Examiner* — Anzuman Sharmin
(74) *Attorney, Agent, or Firm* — NSIP Law

(57) ABSTRACT

A method for producing a support structure of a 3D model for 3D printing is provided. A method for producing a support according to an embodiment of the present invention comprises the steps of: dividing a surface constituting a 3D model into multiple surface patches; classifying respective divided surface patches according to geometric characteristics; and producing supports corresponding to the classified characteristics with regard to respective surface patches. Accordingly, during metal laminate manufacturing, the out- (Continued)

put stability may be improved while reducing the support producing process time. In addition, the surfaces may be expressed by different colors according to the result of geometric characteristic classification, and the supports may also be expressed by different colors according to the type, thereby playing the role of guide lines such that the user can recognize the shape of the surfaces and the type of supports to be installed on the corresponding surfaces. Moreover, the size of a support tip is determined in view of the thickness of the area in which a support is to be produced, thereby preventing the problem of output quality degradation which would otherwise occur because the support cannot move upwards through an output part.

18 Claims, 13 Drawing Sheets

(51) Int. Cl.
  *B33Y 50/02* (2015.01)
  *G06T 17/20* (2006.01)
  *B22F 10/38* (2021.01)
  *B22F 10/47* (2021.01)
  *B22F 10/80* (2021.01)
  *G06T 19/20* (2011.01)
  *B33Y 50/00* (2015.01)

(58) Field of Classification Search
  CPC ............ G06T 2219/2021; G06T 19/20; B22F 10/385; B22F 10/47; B22F 10/80; Y02P 10/25; Y02P 10/00
  USPC .......................................................... 700/98
  See application file for complete search history.

(56) References Cited

U.S. PATENT DOCUMENTS

| | | | |
|---|---|---|---|
| 2015/0151492 A1* | 6/2015 | Schmidt | B29C 64/386 |
| | | | 700/98 |
| 2016/0200051 A1* | 7/2016 | Urbanic | B29C 64/40 |
| | | | 264/308 |
| 2017/0282246 A1* | 10/2017 | Liebl | B23K 26/702 |
| 2018/0036800 A1* | 2/2018 | Torabi | B33Y 40/00 |
| 2019/0373227 A1* | 12/2019 | Pan | H04N 9/3114 |
| 2020/0004225 A1* | 1/2020 | Buller | B29C 64/393 |
| 2020/0232418 A1* | 7/2020 | Adachi | B28B 19/00 |

FOREIGN PATENT DOCUMENTS

| | | |
|---|---|---|
| JP | 2018-58282 A | 4/2018 |
| KR | 10-2016-0112093 A | 10/2017 |
| KR | 10-1796693 B1 | 11/2017 |

* cited by examiner

METHOD FOR PRODUCING 3D MESH SURFACE CHARACTERISTIC-BASED SUPPORT FOR LAMINATE MANUFACTURING

CROSS REFERENCE TO RELATED APPLICATIONS

This application is a U.S. National Stage Application of International Application No. PCT/KR2020/002461, filed on Feb. 20, 2020, which claims the benefit under 35 USC 119(a) and 365(b) of Korean Patent Application No. 10-2019-0037122, filed on Mar. 29, 2019, in the Korean Intellectual Property Office, the entire disclosure of which is incorporated herein by reference for all purposes.

TECHNICAL FIELD

The present disclosure relates to three-dimensional (3D) printing-related technology, and more particularly, to a method for generating a support structure of a 3D model for 3D printing.

BACKGROUND ART

A support structure for related-art 3D printing is a structure for supporting an output during a stacking process or for emitting heat, and is removed after outputting.

Specifically explaining with reference to FIG. 1, a Model is an input 3D file to be outputted, and Sliced Layers are slices of the inputted 3D model.

In addition, a Support Structure is a structure for supporting an output in a stacking process, and is removed after outputting. If an area of the support that touches the model is large, quality of the output may be degraded when the support is removed. Therefore, a portion that touches the model may have a sharp shape like a Support Tip. A Base Plate is used for the purpose of increasing adhesion between a 3D printer output Bed and the output, and may be used for the purpose of emitting heat in metal 3D printing.

Such a support structure may not only influence output stability and output quality, but also greatly influence an outputting time and an amount of materials used for outputting, and a lot of research and development for a method of generating an appropriate support shape at an appropriate position is ongoing.

According to a related-art commercialized tool, an angle is inputted as a user setting value by considering an overhang angle which is formed by a Z-axis and a 3D model surface, and a support is generated at a position exceeding the set angle.

In addition, the related-art commercialized tool provides a function of grouping and managing support areas for user convenience, or may allow a user to change a support set value or a shape according to an area, and may display a position of an overhang area exceeding the set angle.

However, such a related-art commercialized tool which generates a support based on a set value may generate a support the support tip of which breaks through an output part or a support that is not appropriate to a model shape, and thus, may generate an output result different than expected.

In particular, if a size of a support tip is 0.5 mm, but a thickness of an input 3 model is thinner than 0.5 mm, the support tip may break through the model. In this case, when a result is outputted, the result may be different from that expected and there may be a problem that it is very difficult to perform post-processing.

When metal additive manufacturing is performed using metal powder, heat is conducted through lasers which are a light source and metal powder is fused, and then, is solidified. However, heat generated through lasers may not be normally discharged and a resulting output may be rolled up or dross formation may be formed, and thus output quality may be degraded.

To solve these problems, a related-art method may basically use an auto generation function, and then, may manually generate a support. However, since problems arising are different according shapes and the support is generated by directly outputting many times, there may be a problem that much time is required.

Accordingly, there is a demand for a method for enhancing output stability while reducing time required to perform a support generation process when metal additive manufacturing is performed.

DISCLOSURE

Technical Problem

The present disclosure has been developed in order to address the above-discussed deficiencies of the prior art, and an object of the present disclosure is to provide a 3D mesh surface characteristic-based support generation method for additive manufacturing, which classifies areas for generating supports by reflecting geometrical characteristics of a 3D model mesh surface, rather than simply classifying the areas by regions, when generating supports on a surface forming a 3D model, and determines a support type according to a result of the classification, so that time required for the support generation process can be reduced and output stability can be enhanced when metal additive manufacturing is performed.

Another object of the present disclosure is to provide a 3D mesh surface characteristic-based support generation method for additive manufacturing, which expresses surface patches in different colors according to a result of classification of geometrical characteristics of the surfaces, and also expresses supports in different colors according to their types, so that a guide line role can be performed to allow a user to recognize a shape of a surface and a type of a support to be installed on the corresponding surface.

Still another object of the present disclosure is to provide a 3D mesh surface characteristic-based support generation method for additive manufacturing, which determines a size of a support tip by considering a thickness of an area where a support is to be generated, so that the support does not break through an output part and a problem of degradation of output quality can be prevented.

Technical Solution

According to an embodiment of the present disclosure to achieve the above-described objects, a support generation method includes: segmenting a surface forming a 3D model into a plurality of surface patches; classifying the segmented surface patches by geometrical characteristics; and generating supports corresponding to the classified characteristics on the respective surface patches.

In addition, the geometrical characteristics may include at least one of an overhang angle between each surface patch and a Z-axis, a curvature and a slope characteristic of each surface patch.

In addition, the classifying may include: calculating an overhang angle between each surface patch and a Z-axis;

calculating a curvature of each surface patch; and classifying the respective surface patches according to results of calculating the overhang angle and the curvature.

In addition, the classifying according to the results of calculating the overhang angle and the curvature may include classifying the respective surface patches into down-facing surface patches or slope surface patches according to the results of calculating the overhang angle and the curvature, and the generating may include generating a grid support or a solid support on the down-facing surface patch, and generating a point support or a line support on the slope surface patch.

In addition, the classifying may further include: when the respective surface patches are classified into the down-facing surface patches or the slope surface patches, calculating an overhang area between the down-facing surface patch and an adjacent surface patch; and classifying down-facing surface patches the overhang areas of which exceed a predetermined range from among the down-facing surface patches into anchoring surface patches, and the generating may include generating the solid support on the anchoring surface patch, and generating the grid support on the down-facing surface patch that is not the anchoring surface patch.

In addition, the classifying may further include, when the respective surface patches are classified into the down-facing surface patches or the slope surface patches, classifying a slope surface patch corresponding to a sharp spot from among the slope surface patches into a first slope surface patch, or classifying a slope surface patch having a convex, a concave, or a chamfer as a slope characteristic into a second slope surface patch, and the generating may include generating the point support on the first slope surface patch, and generating the line support on the second slope surface patch.

In addition, the support generation method according to an embodiment of the present disclosure may further include: expressing the respective surface patches in different colors according to the classified characteristics; and, after classifying colors of the respective surface patches by characteristics and expressing the colors, expressing the supports in colors corresponding to the colors of the respective surface patches according to the types of the supports.

In addition, the support generation method according to an embodiment may further include calculating thicknesses of the respective surface patches, and the generating the supports may include, when the thicknesses of the respective surface patches are calculated, generating the supports corresponding to the classified characteristics on the respective surface patches, sizes of tips of the generated supports being determined based on results of calculating the thicknesses of the respective surface patches.

In addition, the calculating the thicknesses of the respective surface patches may include calculating a thickness of a surface patch of a position where each support is to be generated by projecting rays in the opposite direction of the surface patch of the position where each support is to be generated from a position of each support tip.

According to another embodiment of the present disclosure, a support generation system includes: a processor configured to segment a surface forming a 3D model into a plurality of surface patches, to classify the segmented surface patches by geometrical characteristics, and to generate supports corresponding to the classified characteristics on the respective surface patches; and an output unit configured to output information regarding the surface forming the 3D model and the supports on a screen.

According to still another embodiment of the present disclosure, a support generation method includes: classifying surface patches forming a 3D model by geometrical characteristics; and generating supports corresponding to the classified characteristics on the respective surface patches.

According to yet another embodiment of the present disclosure, a computer readable recording medium has a program recorded thereon to perform a support generation method, the method including: segmenting a surface forming a 3D model into a plurality of surface patches; classifying the segmented surface patches by geometrical characteristics; and generating supports corresponding to the classified characteristics on the respective surface patches.

Advantageous Effects

According to embodiments of the present disclosure as described above, time required for a support generation process can be reduced when metal additive manufacturing is performed, and output stability can be enhanced.

In addition, according to embodiments of the present disclosure, surface patches are expressed in different colors according to results of classifying geometrical characteristics of a surface, and supports are also expressed in different colors according to their types, so that a guide line role can be performed to allow a user to recognize a shape of a surface and a type of a support installed on the corresponding surface.

In addition, according to various embodiments of the present disclosure, a size of a support tip is determined by considering a thickness of an area where a support is to be generated, so that the support does not break through an output part and a problem of degradation of output quality can be prevented.

BEST MODE

Hereinafter, the present disclosure will be described in detail with reference to the accompanying drawings.

Figure 1:
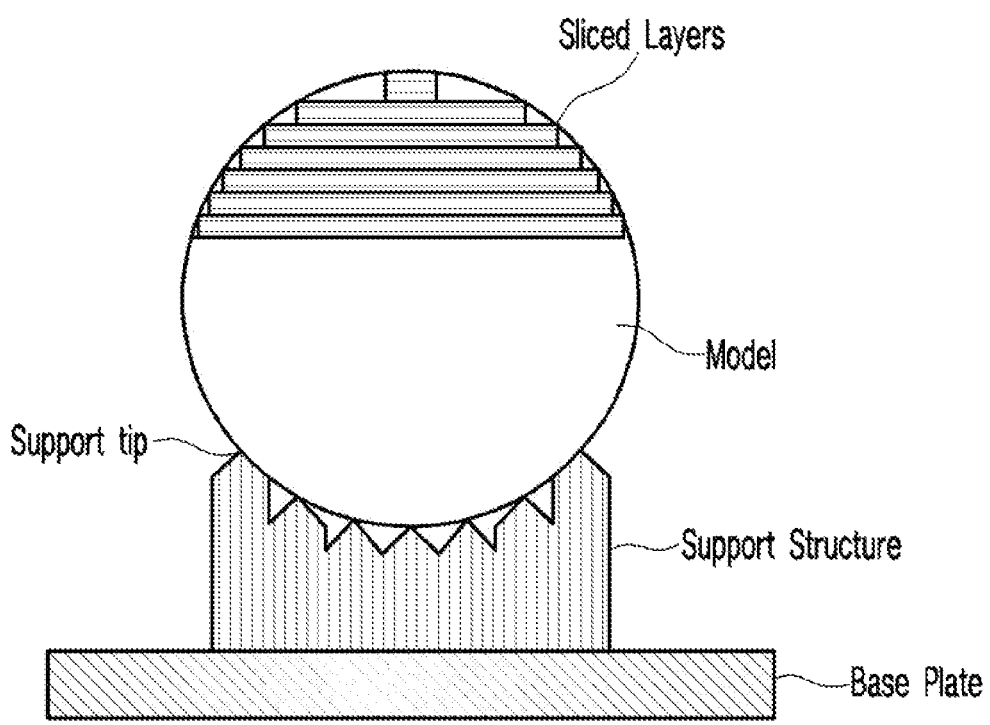
FIG. 1 is a view provided to explain a support structure for related-art 3D printing.
Figure 2:
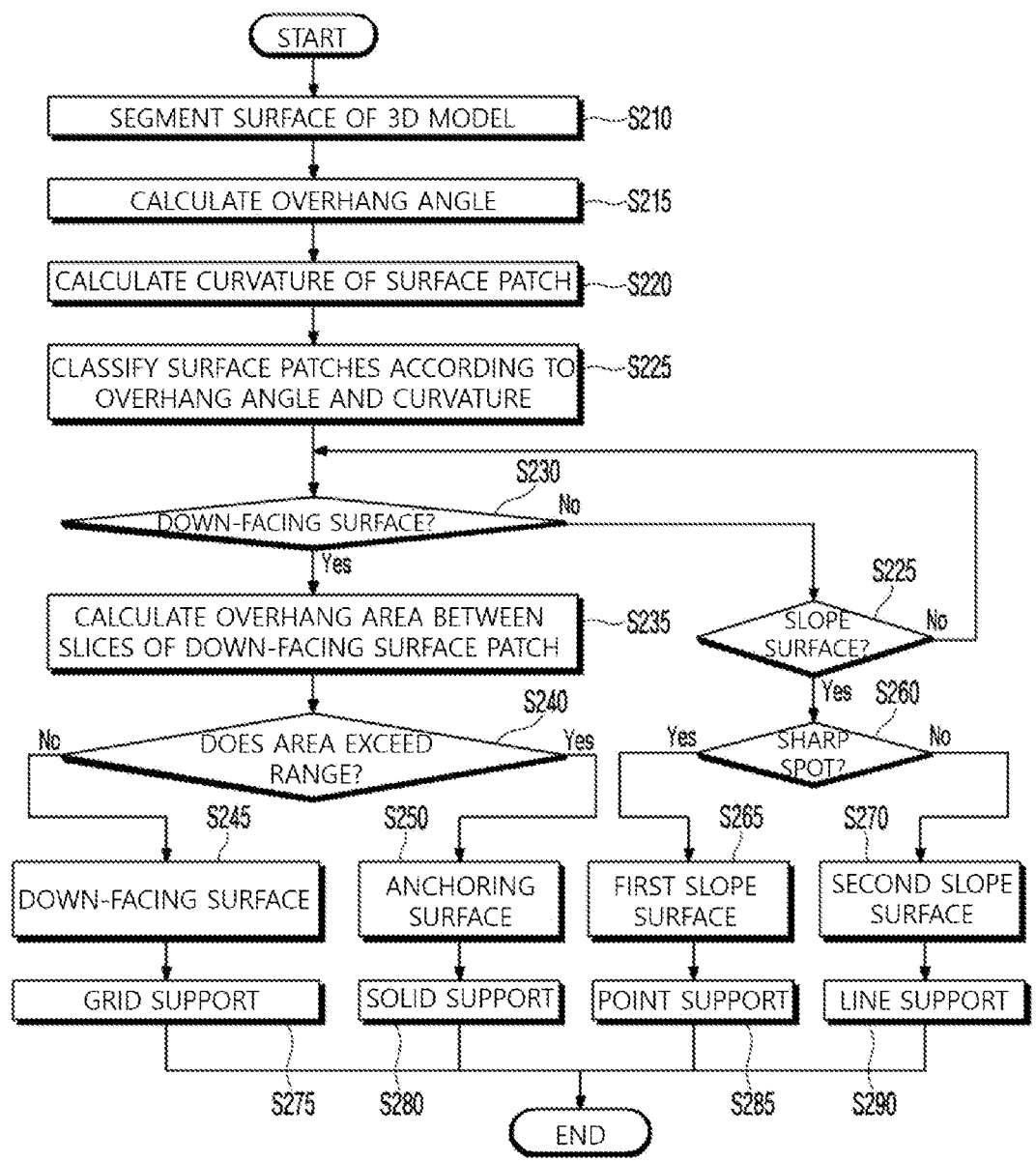
FIG. 2 is a view provided to explain a 3D mesh surface characteristic-based support generation method for additive manufacturing applied to an embodiment of the present disclosure.

FIG. 2 is a view provided to explain a 3D mesh surface characteristic-based support generation method for additive manufacturing applied to an embodiment of the present disclosure.

The support generation method according to an embodiment of the present disclosure may generate a support on a surface forming a 3D model to use the support as a discharging means of heat generated from a heat source in a stacking process.

In addition, the support generation method classifies areas for generating supports by reflecting geometrical characteristics of the 3D model mesh surface, rather than simply classifying the areas by regions, and determines a type of a support according to a result of the classification, thereby reducing time required for the support generation process and enhancing output stability when metal additive manufacturing is performed.

Figure 3:
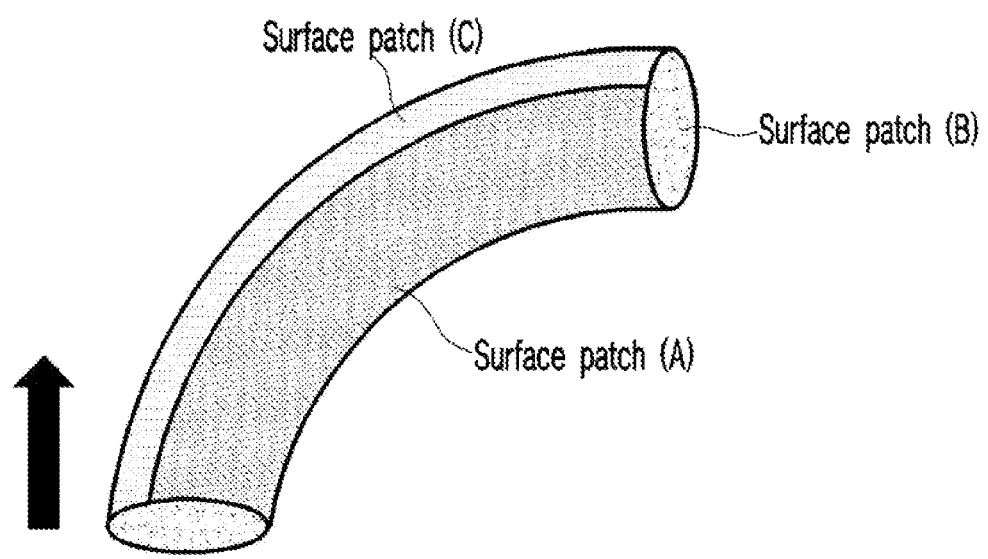
FIG. 3 is a view provided to explain a process of segmenting a surface of a 3D model into a plurality of surface patches.

To achieve this, the support generation method according to an embodiment of the present disclosure may segment a surface forming a 3D model into a plurality of surface patches as shown in FIG. 3 (S210).

When the surface is segmented into the plurality of surface patches, the segmented respective surface patches may be classified by geometrical characteristics, and supports corresponding to the classifies characteristics may be generated on the respective surface patches.

In this case, the geometrical characteristics may include at least one of an overhang angle (θ) between each surface patch and a Z-axis, a curvature and a slope characteristic of each surface patch.

Specifically, when the surface is segmented into the plurality of surface patches, an overhang angle (θ) between each of the segmented patches and the Z-axis may be calculated (S215), a curvature of each of the surface patches may be calculated (S220), and the respective surface patches may be classified according to results of calculating the overhang angle (θ) and the curvature (S225). In this case, the overhang angle (θ) refers to an angle between the Z-axis and the surface patch.

For example, the surface patches may be classified into down-facing surface patches or slope surface patches according to the results of calculating the overhang angle and the curvature.

Specifically, the respective surface patches may be classified into the down-facing surface patches or the slope surface patches by determining whether each surface patch is a down-facing surface patch according to the results of calculating the overhang angle and the curvature (S230), selecting surface patches that are not the down-facing surface patches (S230-N), and determining again whether the selected surface patches that are not the down-facing surface patches are the slope surface patches (S255).

Figure 4:
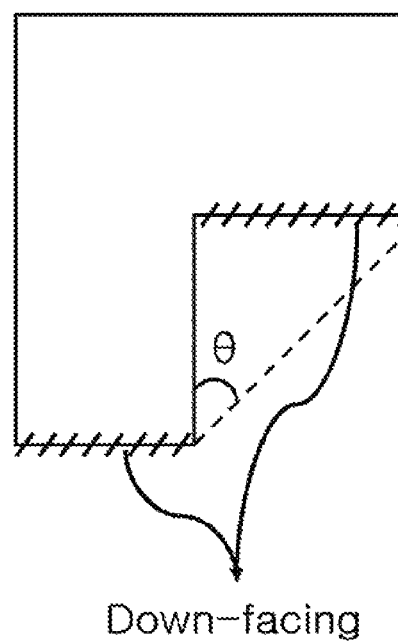
FIG. 4 is a view illustrating a down-facing surface patch.
Figure 5:
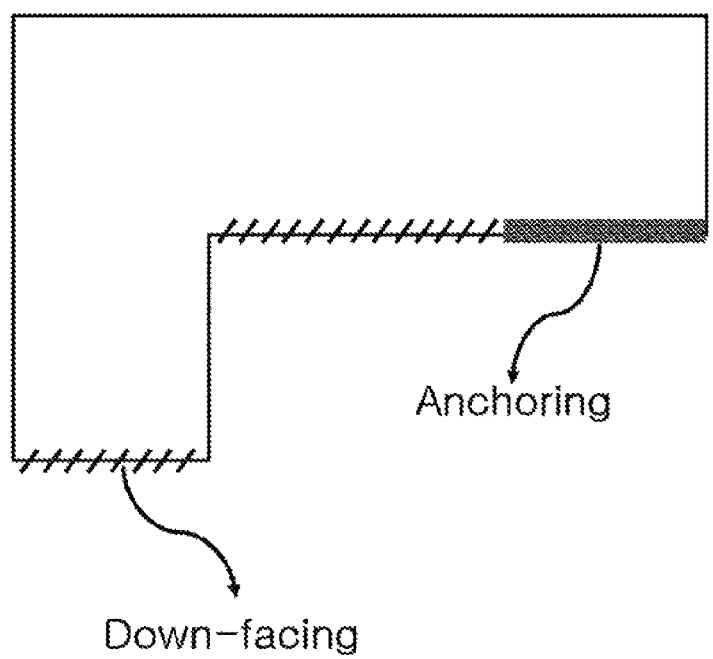
FIG. 5 is a view illustrating an anchoring surface patch.

Herein, the down-facing surface patches may be classified into down-facing surface patches which are not anchoring surface patches, or the anchoring surface patches. The down-facing surface patch that is not the anchoring surface patch, and the anchoring surface patch are illustrated in FIGS. 4 and 5.

The down-facing surface patch that is not the anchoring surface patch, and the anchoring surface patch may be classified by using a width value of the down-facing surface patch on an XY plane. A difference in width between a layer stacked first and a layer to be stacked currently (a difference in an area of an overhang) may be identified, and a portion different from the layer stacked first by a specific width or more may be classified as the anchoring surface patch.

For example, when there are surface patches classified into the down-facing surface patches from among the surface patches (S230-Y), overhang areas between the down-facing surface patches and the Z-axis may be calculated (S235), it may be determined whether a result of calculating the overhang area of each down-facing surface patch exceeds a predetermined range (S240), and, when there are down-facing surface patches the overhang areas of which exceed the predetermined range from among the down-facing surface patches (S240-Y), the down-facing surface patches may be classified into the anchoring surface patches (S250), and, when the overhang area is smaller than or equal to the predetermined range, the down-facing surface patch may be classified into the down-facing surface patch that is not the anchoring surface patch (S245).

Figure 6:
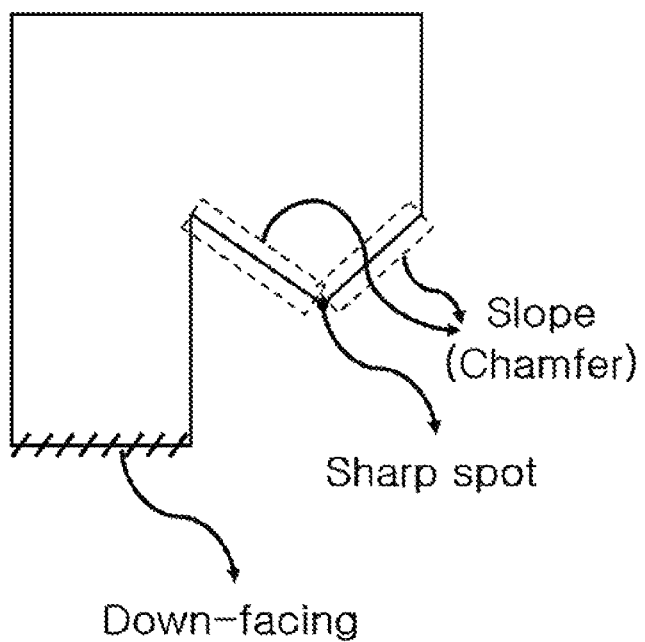
FIG. 6 is a view illustrating a first slope surface patch corresponding to a sharp spot from among slope surface patches, and a second slope surface patch having a chamfer and a convex as slope characteristics.
Figure 7:
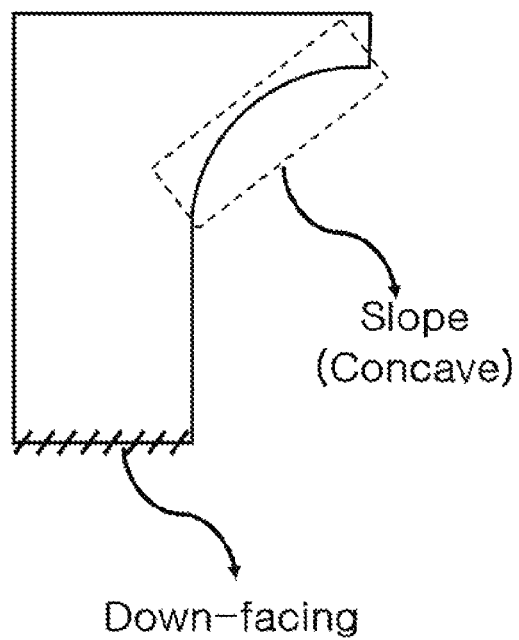
FIG. 7 is a view illustrating the second slope surface patch which has a concave as a slope characteristic from among slope surface patches.
Figure 8:
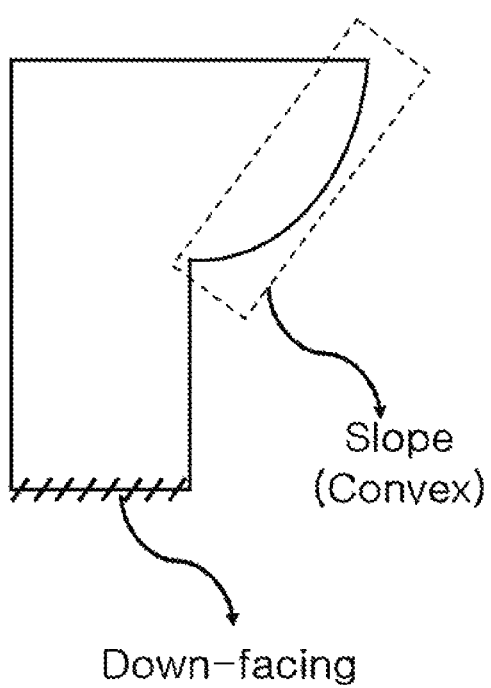
FIG. 8 is a view illustrating the second slope surface patch which has a convex as a slope characteristic from among slope surface patches.

In addition, when there are surface patches classified into the slope surface patches from among the surface patches (S225-Y), and there is a slope surface patch corresponding to a sharp spot as shown in FIG. 6 (S260-Y), the slope surface patch may be classified into a first slope surface patch (S265), and, when there is a slope surface patch having the other slope characteristics illustrated in FIGS. 6 to 8 (S260-N), the slope surface patch may be classified into a second slope surface patch (S270).

For example, from among the surface patches classified into the slope surface patches, a slope surface patch corresponding to the sharp spot illustrated in FIG. 6 may be classified into the first slope surface patch, or a slope surface patch having a concave shown in FIG. 7, a convex shown in FIG. 8, or a chamfer shown in FIG. 6 as a slope characteristic may be classified into the second slope surface patch.

When classification of the respective surface patches by characteristics is completed, supports corresponding to the classified characteristics may be generated on the surface patches.

A grid support may be generated on the down-facing surface that is not the anchoring surface patch (S275), a solid support may be generated on the anchoring surface patch (S280), a point support may be generated on the first slope surface patch (S285), and a line support may be generated on the second slope surface patch (S290).

In generating supports on a surface forming a 3D model through the above-described method, the method may classify areas for generating supports by reflecting geometrical characteristics of the 3D model mesh surface, rather than simply classifying the areas by regions, and may determine support types according to results of the classification, thereby reducing time required for the support generation process and enhancing output stability when metal additive manufacturing is performed.

Figure 9:
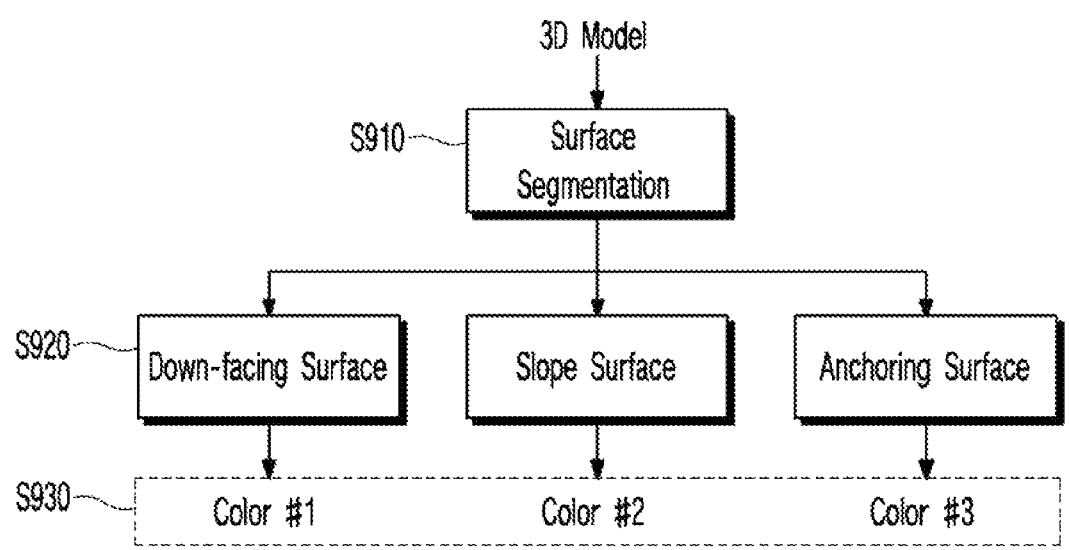
FIG. 9 is a view provided to explain a process of expressing surface patches in different colors according to classified characteristics.

FIG. 9 is a view provided to explain a process of expressing surface patches in different colors according to classified characteristics.

Figure 10:
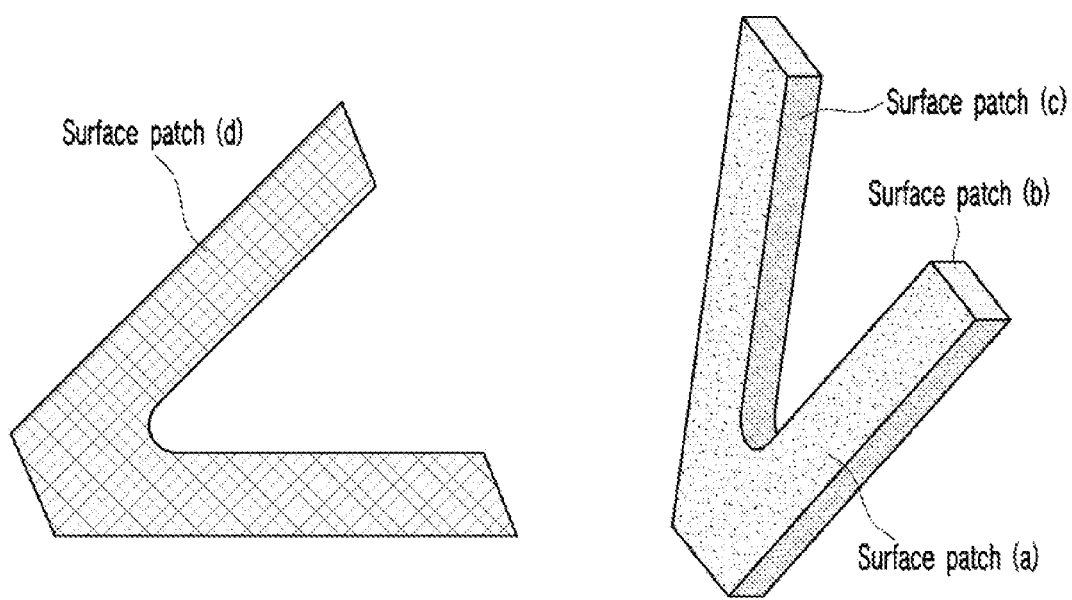
FIG. 10 is a view illustrating surface patches expressed in different colors.

The support generation method according to an embodiment of the present disclosure segments a surface forming a 3D model into a plurality of surface patches (S910), and, when classification of the surface patches by characteristics is completed (S920), may express the surface patches in different colors according to the classified characteristics (S930) as shown in FIG. 10.

Through this, a guide line role can be performed to allow a user to recognize a shape of a corresponding surface.

In addition, when the respective surface patches are expressed in different colors according to the classified characteristics and supports corresponding to the classified characteristics are generated on the respective surface patches, the supports may be expressed in colors corresponding to the colors of the respective surface patches according to their types.

That is, the supports, that is, the grid support, the solid support, the point support, and the line support are expressed in different colors, so that the supports can perform a guide line role to allow the user to recognize the types of the supports to be installed on the corresponding surface.

Figure 11:
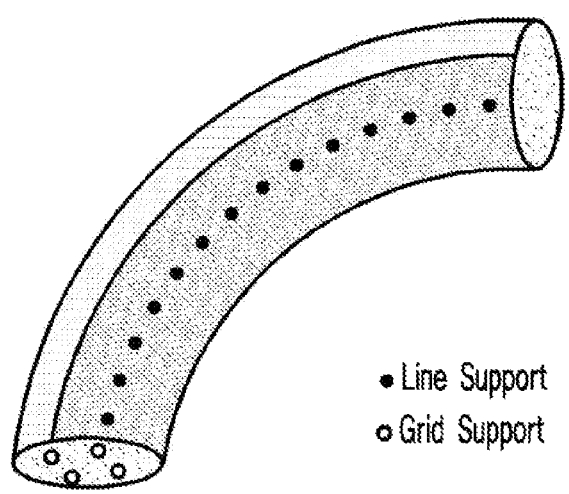
FIG. 11 is a view illustrating supports expressing colors corresponding to the colors of respective surface patches.

Additionally, the embodiments described above with reference to FIGS. 9 to 11 are not limited to the metal additive manufacturing and are applicable to other 3D printing fields and various modifications are possible.

Figure 12A:
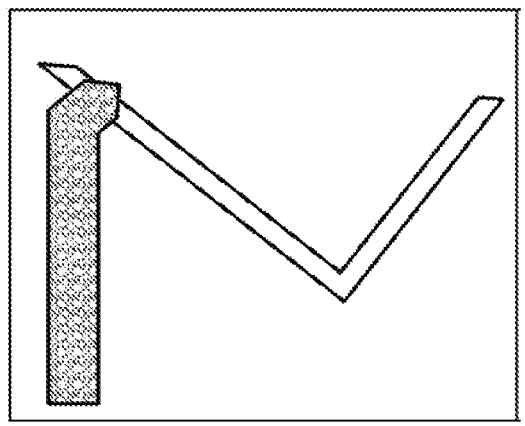
FIGS. 12A and 12B are views illustrating a support tip generated based on a set value in a related-art method, and a support tip generated by considering a thickness.
Figure 12B:
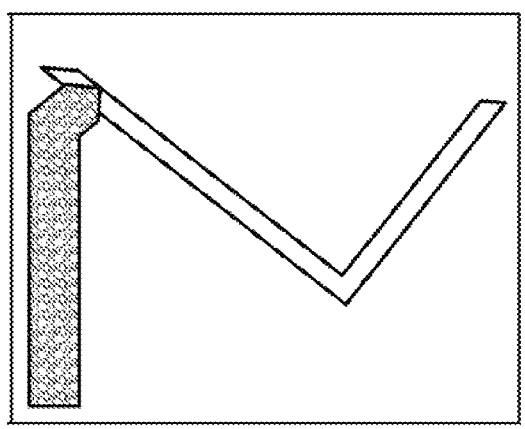

FIGS. 12A and 12B are views illustrating a related-art support tip generated based on a set value, and a support tip generated by considering a thickness. Specifically, FIG. 12A is a view illustrating the related-art support tip generated based on the set value, and FIG. 12B is a view illustrating the support tip generated by considering the thickness.

The support generation method according to an embodiment of the present disclosure determines a size of a support tip by considering a thickness of an area where the support tip is to be generated, so that the support does not break through an output part and a problem of degradation of output quality can be prevented as shown in FIG. 12B.

To achieve this, the support generation method according to an embodiment of the present disclosure may calculate thicknesses of respective surface patches, and may generate supports corresponding to classified characteristics of the surface patches when the thicknesses of the surface patches are calculated, and in generating the supports, the method may determine sizes of tips of the generated supports based on results of calculating the thicknesses of the surface patches.

In this case, a thickness of a surface patch of a position where each support is to be generated may be calculated by projecting rays in the opposite direction of the surface patch of the position where each support is to be generated from a position of each support tip.

Additionally, the embodiment described above with reference to FIGS. 12A and 12B are not limited to the metal additive manufacturing and is applicable to other 3D printing fields and various modifications are possible.

Figure 13:
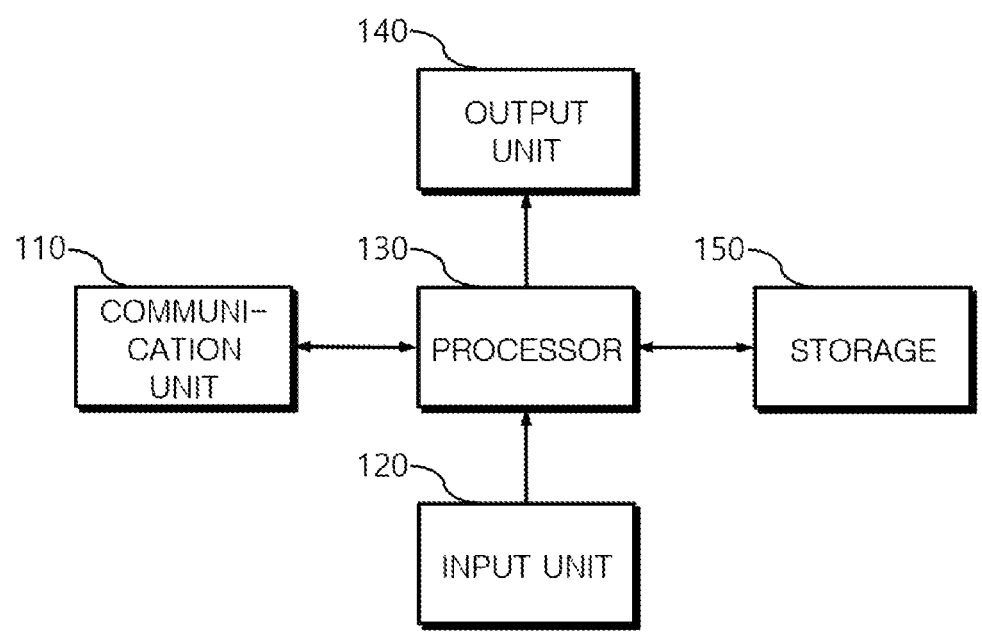
FIG. 13 is a view provided to explain a 3D mesh surface characteristic-based support generation system for additive manufacturing applied to an embodiment of the present disclosure.

FIG. 13 is a view provided to explain a 3D mesh surface characteristic-based support generation system for additive manufacturing applied to an embodiment of the present disclosure. As shown in FIG. 13, the 3D mesh surface characteristic-based support generation system applied to an embodiment of the present disclosure may include a communication unit 110, an input unit 120, a processor 130, an output unit 140, and a storage 150.

The communication unit 110 is a means for communicating with external devices including a 3D printer and connecting to a server, a cloud, or the like through a network, and may transmit, receive, upload and/or download data necessary for 3D printing.

The input unit 120 is a means for receiving setting/command related to 3D printing and generation of a support structure.

The processor 130 performs the 3D mesh surface characteristic-based support generation method for additive manufacturing described above with reference to FIGS. 2 to 12.

Specifically, the processor 130 may segment a surface forming a 3D model into a plurality of surface patches, may classify the segmented surface patches by geometrical characteristics, and may generate supports corresponding to the classified characteristics on the surface patches.

The output unit 140 is a display for outputting information related to the surface forming the 3D model and the supports on a screen.

The storage 150 is a storage medium for providing a storage space necessary for normal operations of the processor 130.

The technical concept of the present disclosure may be applied to a computer-readable recording medium which records a computer program for performing functions of the apparatus and the method according to the present embodiment. In addition, the technical concept according to various embodiments of the present disclosure may be implemented in the form of a computer-readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical concept or prospect of the present disclosure.

The invention claimed is:

1. A support generation method comprising:
   segmenting a surface forming a 3D model into a plurality of surface patches;
   classifying the segmented surface patches by geometrical characteristics based on a width value of at least one of the segmented surface patches, including calculating overhang areas between the plurality of surface patches and a Z-axis and identifying a difference in width between a layer stacked previously and a layer to be stacked currently and calculating thicknesses of the respective surface patches by calculating a thickness of a surface patch of a position where each support is to be generated by projecting rays in the opposite direction of the surface patch of the position where each support is to be generated from a position of each support tip; and
   generating supports corresponding to the classified characteristics on the respective surface patches.

2. The method of claim 1, wherein the geometrical characteristics comprise at least one of an overhang angle between each surface patch and the Z-axis, a curvature and a slope characteristic of each surface patch.

3. The method of claim 1, wherein the classifying comprises:
  calculating an overhang angle between each surface patch and the Z-axis;
  calculating a curvature of each surface patch; and
  classifying the respective surface patches according to results of calculating the overhang angle and the curvature.

4. The method of claim 3, wherein the classifying according to the results of calculating the overhang angle and the curvature comprises classifying the respective surface patches into down-facing surface patches or slope surface patches according to the results of calculating the overhang angle and the curvature, and
  wherein the generating comprises generating a grid support or a solid support on the down-facing surface patch, and generating a point support or a line support on the slope surface patch.

5. The method of claim 4, wherein the classifying further comprises:
  when the respective surface patches are classified into the down-facing surface patches or the slope surface patches, calculating an overhang area between the down-facing surface patch and an adjacent surface patch; and
  classifying down-facing surface patches the overhang areas of which exceed a predetermined range from among the down-facing surface patches into anchoring surface patches, and
  wherein the generating comprises generating the solid support on the anchoring surface patch, and generating the grid support on the down-facing surface patch that is not the anchoring surface patch.

6. The method of claim 4, wherein the classifying further comprises, when the respective surface patches are classified into the down-facing surface patches or the slope surface patches, classifying a slope surface patch corresponding to a sharp spot from among the slope surface patches into a first slope surface patch, or classifying a slope surface patch having a convex, a concave, or a chamfer as a slope characteristic into a second slope surface patch, and
  wherein the generating comprises generating the point support on the first slope surface patch, and generating the line support on the second slope surface patch.

7. The method of claim 5, further comprising:
  expressing the respective surface patches in different colors according to the classified characteristics; and
  after classifying colors of the respective surface patches by characteristics and expressing the colors, expressing the supports in colors corresponding to the colors of the respective surface patches according to the types of the supports.

8. The method of claim 1,
  wherein the generating the supports comprises, when the thicknesses of the respective surface patches are calculated, generating the supports corresponding to the classified characteristics on the respective surface patches, sizes of tips of the generated supports being determined based on results of calculating the thicknesses of the respective surface patches.

9. The method of claim 6, further comprising:
  expressing the respective surface patches in different colors according to the classified characteristics; and
  after classifying colors of the respective surface patches by characteristics and expressing the colors, expressing the supports in colors corresponding to the colors of the respective surface patches according to the types of the supports.

10. A support generation system comprising:
  a processor configured to:
  segment a surface forming a 3D model into a plurality of surface patches;
  classify the segmented surface patches by geometrical characteristics based on a width value of at least one of the segmented surface patches, including calculating overhang areas between the plurality of surface patches and a Z-axis and identifying a difference in width between a layer stacked previously and a layer to be stacked currently and calculating thicknesses of the respective surface patches by calculating a thickness of a surface patch of a position where each support is to be generated by projecting rays in the opposite direction of the surface patch of the position where each support is to be generated from a position of each support tip;
  generate supports corresponding to the classified characteristics on the respective surface patches; and
  output information regarding the surface forming the 3D model and the supports on a screen.

11. The system of claim 10, wherein, for the classifying, the processor is further configured to:
  calculate an overhang angle between each surface patch and the Z-axis;
  calculate a curvature of each surface patch; and
  classify the respective surface patches according to results of calculating the overhang angle and the curvature.

12. The system of claim 11, wherein, for the classifying according to the results of calculating the overhang angle and the curvature, the processor is further configured to classify the respective surface patches into down-facing surface patches or slope surface patches according to the results of calculating the overhang angle and the curvature, and
  wherein, for the generating, the processor is further configured to generate a grid support or a solid support on the down-facing surface patch, and generate a point support or a line support on the slope surface patch.

13. The system of claim 12, wherein, for the classifying, the processor is further configured to:
  when the respective surface patches are classified into the down-facing surface patches or the slope surface patches, calculate an overhang area between the down-facing surface patch and an adjacent surface patch; and
  classify down-facing surface patches the overhang areas of which exceed a predetermined range from among the down-facing surface patches into anchoring surface patches, and
  wherein, for the generating, the processor is further configured to generate the solid support on the anchoring surface patch, and generate the grid support on the down-facing surface patch that is not the anchoring surface patch.

14. The system of claim 12, wherein, for the classifying, the processor is further configured to, when the respective surface patches are classified into the down-facing surface patches or the slope surface patches, classify a slope surface patch corresponding to a sharp spot from among the slope surface patches into a first slope surface patch, or classify a slope surface patch having a convex, a concave, or a chamfer as a slope characteristic into a second slope surface patch, and wherein, for the generating, the processor is further configured to generate the point support on the first slope surface patch, and generate the line support on the second slope surface patch.

15. The system of claim 13, wherein the processor is further configured to:
express the respective surface patches in different colors according to the classified characteristics; and
after classifying colors of the respective surface patches by characteristics and expressing the colors, express the supports in colors corresponding to the colors of the respective surface patches according to the types of the supports.

16. The system of claim 10, wherein the processor is further configured to calculate thicknesses of the respective surface patches,
wherein, for the generating the supports, the processor is further configured to, when the thicknesses of the respective surface patches are calculated, generate the supports corresponding to the classified characteristics on the respective surface patches, sizes of tips of the generated supports being determined based on results of calculating the thicknesses of the respective surface patches.

17. A support generation method comprising:
classifying surface patches forming a 3D model by geometrical characteristics based on a width value of at least one of the surface patches, including calculating overhang areas between the surface patches and a Z-axis and identifying a difference in width between a layer stacked previously and a layer to be stacked currently and calculating thicknesses of the respective surface patches by calculating a thickness of a surface patch of a position where each support is to be generated by projecting rays in the opposite direction of the surface patch of the position where each support is to be generated from a position of each support tip; and
generating supports corresponding to the classified characteristics on the respective surface patches.

18. A non-transitory machine-readable storage medium having a program recorded thereon to perform a support generation method, the method comprising: segmenting a surface forming a 3D model into a plurality of surface patches; classifying the segmented surface patches by geometrical characteristics based on a width value of at least one of the segmented surface patches, including calculating overhang areas between the plurality of surface patches and a Z-axis and identifying a difference in width between a layer stacked previously and a layer to be stacked currently and calculating thicknesses of the respective surface patches by calculating a thickness of a surface patch of a position where each support is to be generated by projecting rays in the opposite direction of the surface patch of the position where each support is to be generated from a position of each support tip; and generating supports corresponding to the classified characteristics on the respective surface patches.

* * * * *